Nov. 9, 1937.  W. S. MOFFITT  2,098,669

PIPE UNION

Filed June 1, 1936

Inventor
Walter S. Moffitt
By Nathaniel Frucht
Attorney

Patented Nov. 9, 1937

2,098,669

UNITED STATES PATENT OFFICE 2,098,669

PIPE UNION

Walter S. Moffitt, Warwick, R. I.

Application June 1, 1936, Serial No. 82,705

1 Claim. (Cl. 285—124)

My present invention relates to pipe connections, and has particular reference to a novel construction for a union.

Unions such as are used for connecting the ends of pipes are ordinarily made of cast iron or of brass, the brass unions being used where the fluid transmitted in the pipes have a corrosive or rusting tendency. Each type has its advantages and disadvantages, the iron union using inexpensive materials, but having a tendency to rust, and the brass union using relatively expensive materials, and lacking the strength of the iron union.

It is the principal object of my invention to provide a brass union which has the non-corrosive qualities of the brass type and which has the strength of the iron type.

It is a further object of my invention to provide a simple construction for forming a composite union with all parts contacted by the fluid of non-corrosive material, and all the parts requiring strength of material having great tensile strength.

With the above and other objects and advantageous features in view, my invention consists of a novel arrangement of parts more fully disclosed in the detailed description following, in conjunction with the accompanying drawings, and more specifically defined in the claims appended thereto.

Figure 1:
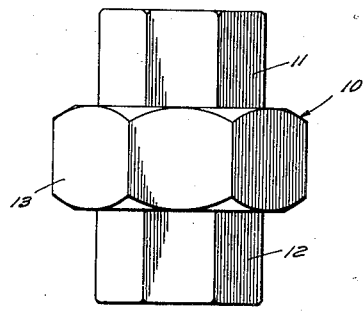
Fig. 1 is an elevation of an assembled union embodying the principles of my invention.
Figure 2:
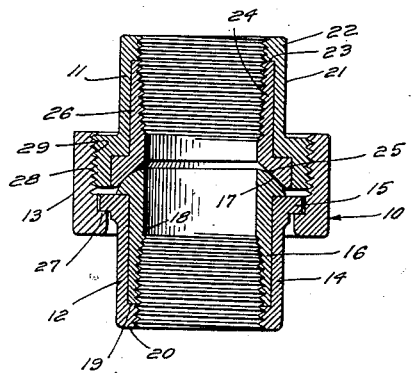
Fig. 2 is a vertical section therethrough.

Referring to the drawing, the novel union 10 comprises a union member 11, a cooperating union member 12 and a lock ring 13, these parts having the usual hexagonal formation for facilitating gripping engagement of pipe wrenches. The lower member 12 includes an outer shell 14 of material of great tensile strength, such as cast iron, having a laterally extending flange 15 for engagement by the ring as hereinafter explained, and an inner union member 16 of non-corrosive material such as brass, the inner union member having a contact face 17 and an inner cylindrical portion 18, which fits into a stepped recess 19 formed in the foot 20 of the member 14, the contact face 17 being sloping and slightly arcuate, as illustrated in Fig. 2, and extending over the upper edge of the member 14. The foot 20 of the member 14 and the inner surface of the cylindrical portion 18 are threaded to receive a pipe end.

The union element 11 is of generally similar construction, comprising an outer member 21 of iron, having a foot 22 with a stepped recess 23, a brass inner union 24 being seated therein, and having a contact face 25 of conical formation for contacting engagement with the face 17, and an inner cylindrical portion 26, the inner surface of the cylindrical portion and the inner surface of the foot 22 being threaded to receive the other pipe end.

The ring 13, see Fig. 2, has a stepped recess 27 for locking engagement with the flange 15, and a threaded portion 28 which is adapted to engage the corresponding exterior threads 29 of the upper portion 11, whereby turning the ring 13 draws the two union members together so as to tightly engage the face 17 and 25, which cooperate to seal the union against outflow of fluid.

It is thus evident that the novel union consists of two cooperating inner brass unions which are seated in and are supported by outer iron housings, the clamping ring engaging these outer iron housings, whereby the strain comes on the outer iron parts, and the sealing is effected by the inner brass parts; the inner brass parts engage the ends of the pipes so as to prevent any contact of fluid with the outer iron parts. The novel union thus combines the effectiveness and the non-corrosive action of a brass union with the strength and the decreased material cost of an iron union.

Figure 3:
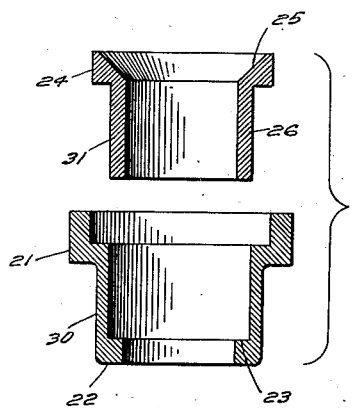
Fig. 3 is a composite view showing the parts for forming one of the union elements, prior to joining.
Figure 4:
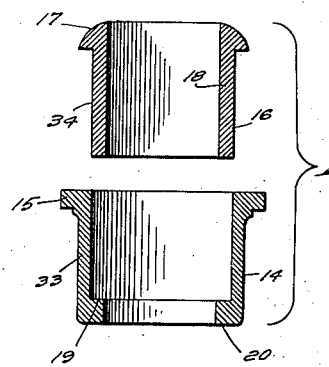
Fig. 4 is a composite view showing the parts for forming the cooperating union element, prior to joining.
Figure 5:
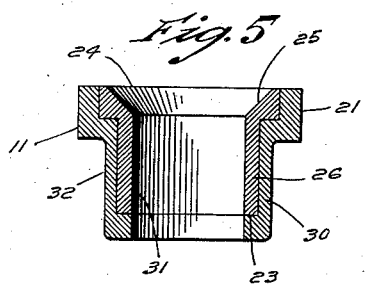
Fig. 5 is a view showing the parts of Fig. 3 joined, prior to threading.
Figure 6:
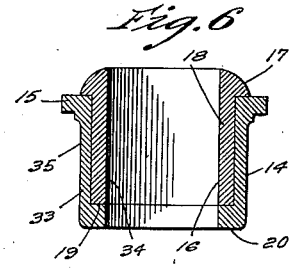
Fig. 6 is a similar view showing the parts of Fig. 4 joined, prior to threading.

In manufacturing the novel union, the preferred method is to use a shell 30 of iron, see Fig. 3, which is recessed as shown, and an inner member 31 of brass, of the shape shown in Fig. 3, the two parts being forced together under pressure to form a composite blank 32, see Fig. 5, which can then be machined to provide the screw threads shown in Fig. 2 to form the union member 11. Similarly, an iron base 33 and an inner brass member 34, see Fig. 4, are forced together under pressure to form a blank 35, see Fig. 6, which can then be threaded to form the union member 12. The preferred construction is thus to utilize a force fit between the outer iron members and the inner brass members, so as to prevent relative rotation and relative movement; keys or cooperating projections and recesses of standard type can be provided, if desired, between the joined members to effectively prevent relative movement. The preferred length of the brass members is as shown in Fig. 2, to provide sufficient contact with the pipe ends so that no fluid can pass through the threads to contact the iron parts. In certain constructions, it may be desirable to have the inner brass members somewhat loose in the iron members, as the effectiveness of the seal does not depend in any way on the locking of the brass parts in the iron parts; such a construction is particularly suitable for connections where the pipes may not be in exact alignment, as it permits a slight change in position of the inner brass parts while maintaining an effective sealing action.

Although I have described the union parts as being made of brass and of iron, it is obvious that any material, and particularly non-corrosive material, may be used for the inner parts, and any material, preferably a material of great strength may be used for the outer parts, the shape of the contact faces and of the engaging portions, and the relative sizes and widths of the parts being changed to meet different union requirements, without departing from the spirit and scope of the invention as defined in the appended claim.

I claim:

In a pipe union, two outer shells each having outwardly turned annular flanges at one end and inwardly turned annular flanges at the other end, each shell having elongated cylindrical members of non-corrodible metal seated therein with one end of each non-corrodible cylinder abutted against the inwardly turned flange of its shell and the other ends of said cylindrical members being formed to provide engageable sealing surfaces, the flanges and the adjacent portions of the cylindrical members having a continuous screw thread, and means engaging the outer flanges to detachably lock the shells and the cylindrical members together.

WALTER S. MOFFITT.